(12) United States Patent
Kachare et al.

(10) Patent No.: US 12,147,358 B2
(45) Date of Patent: *Nov. 19, 2024

(54) SYSTEMS AND METHODS FOR MESSAGE TUNNELING

(71) Applicant: Samsung Electronics Co., Ltd., Suwon-si (KR)

(72) Inventors: Ramdas P. Kachare, Pleasanton, CA (US); Zvi Guz, Palo Alto, CA (US); Son T. Pham, San Ramon, CA (US); Anahita Shayesteh, Los Altos, CA (US); Xuebin Yao, San Diego, CA (US); Oscar Prem Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,870

(22) Filed: Aug. 14, 2023

(65) Prior Publication Data

US 2023/0393996 A1 Dec. 7, 2023

Related U.S. Application Data

(63) Continuation of application No. 17/338,654, filed on Jun. 3, 2021, now Pat. No. 11,726,930, which is a
(Continued)

(51) Int. Cl.
*G06F 13/16* (2006.01)
*G06F 3/06* (2006.01)
(Continued)

(52) U.S. Cl.
CPC ........ *G06F 13/1668* (2013.01); *G06F 3/0604* (2013.01); *G06F 3/0659* (2013.01);
(Continued)

(58) Field of Classification Search
CPC ............ G06F 13/1668; G06F 13/4282; G06F 3/0604; G06F 3/0659; G06F 3/0673; G06F 9/547; G06F 2213/0026
See application file for complete search history.

(56) References Cited

U.S. PATENT DOCUMENTS 6,338,108 B1 1/2002 Motomura
6,683,885 B1 * 1/2004 Sugai .................... H04L 49/205
370/389
(Continued)

FOREIGN PATENT DOCUMENTS

CN 1606858 A 4/2005
JP H10289192 A 10/1998
(Continued)

*Primary Examiner* — Henry Tsai
*Assistant Examiner* — John B Roche
(74) *Attorney, Agent, or Firm* — Renaissance IP Law Group LLP

(57) ABSTRACT

According to one general aspect, a device may include a host interface circuit configured to communicate with a host device via a data protocol that employs data messages. The device may include a storage element configured to store data in response to a data message. The host interface circuit may be configured to detect when a tunneling command is embedded within the data message; extract a tunneled message address information from the data message; retrieve, via the tunneled message address information, a tunneled message stored in a memory of the host device; and route the tunneled message to an on-board processor and/or data processing logic. The on-board processor and/or data processing logic may be configured to execute one or more instructions in response to the tunneled message.

20 Claims, 6 Drawing Sheets

Related U.S. Application Data continuation of application No. 16/794,217, filed on Feb. 18, 2020, now Pat. No. 11,030,129.

(60) Provisional application No. 62/902,949, filed on Sep. 19, 2019.

(51) Int. Cl.
*G06F 9/54* (2006.01)
*G06F 13/42* (2006.01)

(52) U.S. Cl.
CPC .......... *G06F 3/0673* (2013.01); *G06F 9/547* (2013.01); *G06F 13/4282* (2013.01); *G06F 2213/0026* (2013.01)

(56) References Cited

U.S. PATENT DOCUMENTS

| | | | |
|---|---|---|---|
| 7,412,486 B1* | 8/2008 | Petrack | H04L 51/04 709/202 |
| 8,078,788 B2* | 12/2011 | Chang | G06F 13/4291 710/13 |
| 8,407,370 B2 | 3/2013 | Tokoro et al. | |
| 8,589,568 B2 | 11/2013 | Arnold et al. | |
| 8,769,253 B2* | 7/2014 | Bubb | G06F 13/20 709/219 |
| 9,189,378 B1* | 11/2015 | Ryan | G06F 11/3668 |
| 9,933,976 B2 | 4/2018 | Tsujimoto et al. | |
| 10,185,670 B2 | 1/2019 | Litichever et al. | |
| 10,394,746 B2 | 8/2019 | Kachare et al. | |
| 10,515,049 B1* | 12/2019 | Fleming | G06F 15/7892 |
| 10,545,862 B2 | 1/2020 | Kanno et al. | |
| 10,768,858 B2 | 9/2020 | Kanno et al. | |
| 11,575,505 B2* | 2/2023 | Kachare | G06F 21/79 |
| 2005/0060472 A1* | 3/2005 | Mantey | G06F 13/4282 710/305 |
| 2005/0063381 A1 | 3/2005 | Kayalackakom et al. | |
| 2011/0099296 A1* | 4/2011 | Lin | G06F 3/0674 710/4 |
| 2014/0025771 A1 | 1/2014 | Tanaka et al. | |
| 2016/0127492 A1 | 5/2016 | Malwankar et al. | |
| 2019/0141406 A1* | 5/2019 | Casagrande | H04N 21/4888 |
| 2019/0303153 A1* | 10/2019 | Halpern | G06F 15/825 |

FOREIGN PATENT DOCUMENTS

| | | |
|---|---|---|
| JP | 2013062683 A | 4/2013 |
| JP | 2013109419 A | 6/2013 |
| JP | 2013524334 A | 6/2013 |
| JP | 2019057151 A | 4/2019 |
| JP | 2019075104 A | 5/2019 |
| JP | 2019105873 A | 6/2019 |
| TW | 200515153 A | 5/2005 |
| WO | 2015166540 A1 | 11/2015 |

* cited by examiner

SYSTEMS AND METHODS FOR MESSAGE TUNNELING

CROSS-REFERENCE TO RELATED APPLICATIONS

This application is a continuation of U.S. patent application Ser. No. 17/338,654, filed Jun. 3, 2021, which is a continuation of U.S. patent application Ser. No. 16/794,217, filed Feb. 18, 2020, now U.S. Pat. No. 11,030,129, which claims priority under 35 U.S.C. § 119 to U.S. Provisional Patent Application Ser. No. 62/902,949, filed Sep. 19, 2019, all of which are incorporated by reference herein for all purposes.

TECHNICAL FIELD

This description relates to computer communication and, more specifically, to systems and methods for message tunnel using computer protocols such as non-volatile memory express (NVMe).

BACKGROUND

In modern information technology (IT) infrastructure, relatively large amounts of data may be generated by various devices and processes. Some examples of these data generators include, but are not be limited to, smart machines, autonomous vehicles, social networks, and internet of things (IoT) devices. Further, various artificial intelligence (AI) and machine learning techniques may be used to effectively analyze the collected data and use it to achieve greater efficiency and productivity of applications.

Moving relatively large amounts of raw data to processors for processing and analyzing may be expensive in terms of the amount of energy consumed, and computer and network resources deployed. Accordingly, moving large amounts of raw data may increase the burden on resources, such as network bandwidth, processor cycles, and memory usage. Further, moving large amounts of raw data to servers for processing may also increase the latency experienced by the applications.

SUMMARY

According to one general aspect, a device may include a host interface circuit configured to communicate with a host device via a data protocol that employs data messages. The device may include a storage element configured to store data in response to a data message. The host interface circuit may be configured to detect when a tunneling command is embedded within the data message, extract a tunneled message address information from the data message, retrieve, via the tunneled message address information, a tunneled message stored in a memory of the host device, and route the tunneled message to an on-board processor. The on-board processor may be configured to execute one or more instructions in response to the tunneled message.

According to another general aspect, a system may include a host computing device. The host computing device may include a processor configured to read and write data via data messages from a storage device and offload commands to the storage device. The host computing device may include a memory configured to be at least partially allocated for the use of the storage device. The system may include a storage device. The storage device may include a host interface circuit configured to communicate with the host computing device via a data protocol that employs data messages. The storage device may include a storage element configured to store data in response to a data message. The host interface circuit may be configured to: detect when a tunneling command is embedded within the data message, extract a tunneled message address information from the data message, retrieve, via the tunneled message address information, a tunneled message stored in a memory of the host device, and route the tunneled message to an on-board processor and/or data processing logic. The on-board processor and/or data processing logic may be configured to execute one or more instructions or perform certain data processing and other operations in response to the tunneled message.

According to another general aspect, a method of tunneling a remote procedure call through a data protocol may include allocating at least a portion of a host memory buffer included by a host computing device for the communication between the host computing device and an enhanced storage device. The method may include creating a data message that includes an indication that a tunneled message is stored within the portion of the host memory buffer. The method may include transmitting the data message to the enhanced storage device. The method may include, upon receipt of the data message, the enhanced storage device reading the tunneled message from the host computing device. The method may include, in response to the tunneled message, executing one or more instructions by the enhanced storage device.

The details of one or more implementations are set forth in the accompanying drawings and the description below. Other features will be apparent from the description and drawings, as well as from the claims.

A system and/or method for computer communication, and more specifically a method and system for message tunneling using computer protocols such as non-volatile memory express (NVMe), as substantially shown in and/or described in connection with at least one of the figures, is set forth more completely in the claims.

BRIEF DESCRIPTION OF THE DRAWINGS

Like reference symbols in the various drawings indicate like elements.

DETAILED DESCRIPTION

Figure 1:
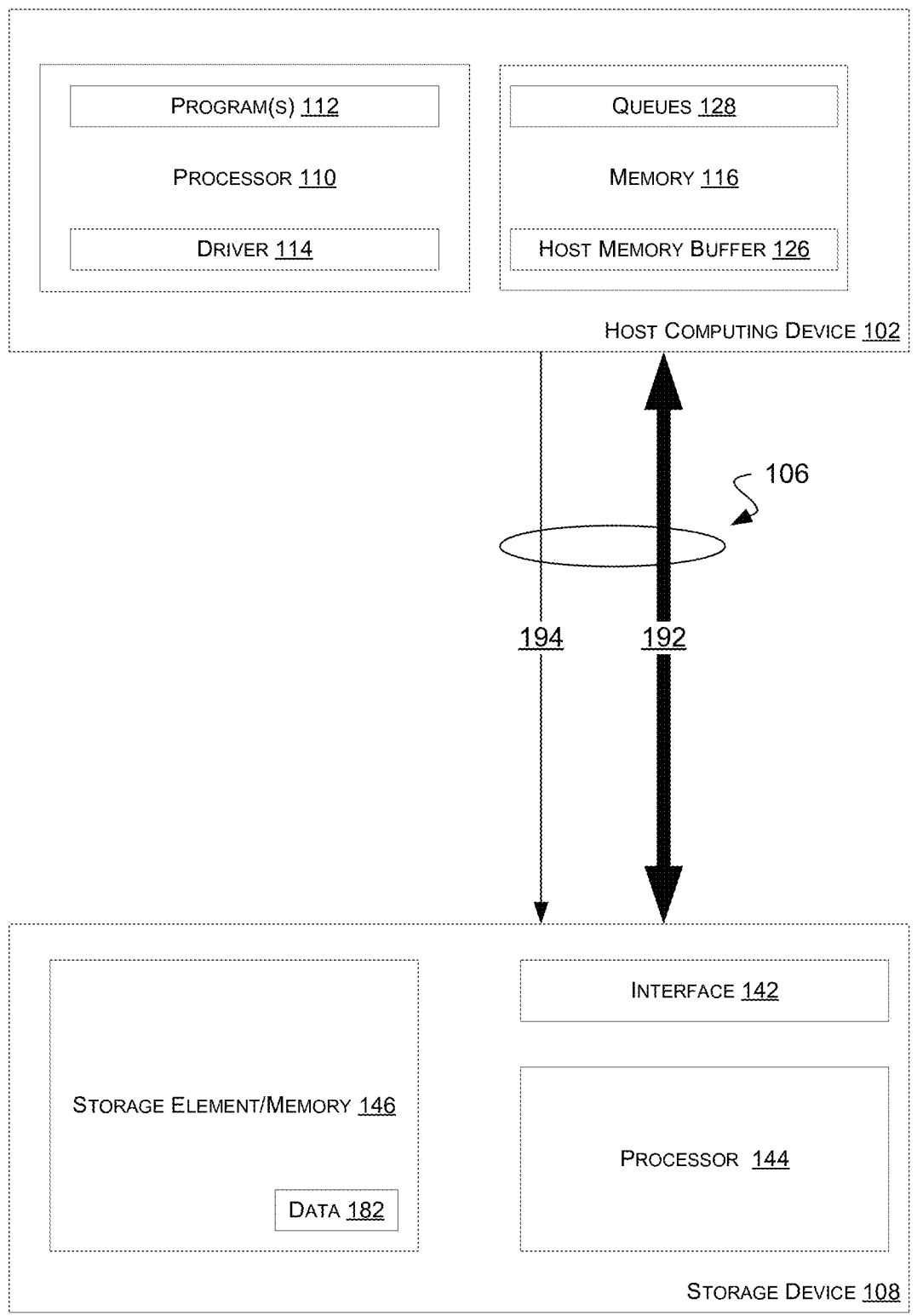
FIG. 1 is a block diagram of an example embodiment of a system that utilizes a tunneling data message in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosed subject matter.

The terminology used herein is for the purpose of describing particular example embodiments only and is not intended to limit the present disclosed subject matter. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, or operations.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Peripheral component interconnect (PCI) express (PCIe or PCI-e) may refer to a high-speed serial computer expansion bus standard. PCIe has features such as relatively high maximum system bus throughput, relatively low input/output (I/O) pin count and small physical footprint, performance scaling for bus devices, an error detection and reporting mechanism (e.g., advanced error reporting), and native hot-plug functionality. The PCIe standard can provide hardware support for I/O virtualization. PCIe is based on point-to-point topology, with separate serial links connecting every device to the root complex (e.g., the host). In terms of bus protocol, PCIe communication is generally encapsulated in packets.

The non-volatile memory (NVM) express (NVMe) or NVM host controller interface specification (NVMHCI) may refer to a logical device interface specification for accessing non-volatile storage media attached via a PCIe bus. NVM may include flash memory that may be used in solid-state drives (SSDs). NVMe, as a logical device interface, features relatively low latency and internal parallelism of flash-based storage devices, mirroring the parallelism of central processing units (CPUs), platforms and applications.

NVMe may serve as an alternative to the small computer system interface (SCSI) or, more specifically, the serial attached SCSI, the standard for connecting and transferring data between a host and a peripheral target storage device or system. NVMe can be used with media such as SSDs and post-flash memory-based technologies.

In distributed computing, a remote procedure call (RPC) may refer to a computer program causing a procedure (subroutine) to execute in a different address space (commonly on another computer on a shared network), which is coded as if it were or is similar to a local procedure call. This can represent a form of client—server interaction (caller is client, executor is server), typically implemented via a request—response message-passing system. In an object-oriented programming paradigm, RPC calls can be represented by remote method invocation (RMI).

FIG. 1 is a block diagram of an example embodiment of a system 100 in accordance with the disclosed subject matter. In various embodiments, the system 100 may include a storage device or storage medium (e.g., hard drive, SSD, flash drive, etc.) In various embodiments, the system 100 may be used by or included by a computing device, such as a laptop, desktop, workstation, datacenter, cloud, personal digital assistant, smartphone, tablet, and other appropriate computers or a virtual machine or virtual computing device thereof.

In some information technology (IT) infrastructures, relatively large amounts of data may be generated by various devices and processes. Some examples of these data generators include, but are not limited to, smart machines, autonomous vehicles, social networks, and internet of things (IoT) devices. In various embodiments, artificial intelligence and/or machine learning techniques may be employed to effectively analyze the collected data and make use of them.

In various embodiments, systems effectively process and analyze data are disclosed herein. In some system architectures, data may be fetched from persistent storage to relatively high-performance servers, which may be connected to storage using relatively high-performance networks. Moving large amounts of raw data to a processor for analysis may consume large amounts of energy, and computer and network resources deployed. Such data movement may create a burden on resources, such as network bandwidth, CPU cycles, and CPU memory. Moving relatively large amounts of raw data to servers for processing may also increase the latency associated with the applications. That is, the increased latency may cause processing of an application to be delayed while data are being fetched to the servers before the processing and analysis at the application may be completed.

In the illustrated embodiment, the system 100 may attempt to reduce the movement of data by processing raw data within the storage device 108. In various embodiments, this may be a more effective solution to data analysis use cases that are appropriate for computation of the growing amount of raw data. Additionally, by eliminating data movements, response latency for application may be improved. Moreover, data analytics tasks that often read a large amount of data, process it, and reduce the data through filtering and other reduction operation may be improved.

In various embodiments, the system 100 may include a host computing device 102. As described above, in various embodiments, this may include a computing device, such as a laptop, desktop, workstation, datacenter, cloud, personal digital assistant, smartphone, tablet, and other appropriate computers or a virtual machine or virtual computing device thereof. In various embodiments, the host computing device 102 may be the portion of the system 100 that includes the processor 110 (e.g., a motherboard, system-on-a-chip, etc.).

In various embodiments, the host computing device 102 may include a processor 110. The processor 110 may be configured to execute instructions or commands and, in doing so, read and write data to a memory 116 and/or storage device 108. In various embodiments, the processor 110 may execute software, such as programs or applications 112 and drivers 114.

In some embodiments, the host computing device 102 may include a memory 116. In such an embodiment, the memory 116 may include a volatile memory (e.g., a random access memory (RAM)). In another embodiment, the memory 116 may include an NVM (e.g., a not-AND (NAND) or Flash memory). In various embodiments, the memory 116 may be configured to store data in a temporary or semi-permanent form. In some embodiments, a portion of the memory 116 may be portioned or include circuits that act as host memory buffers 126 and/or queues 128 (e.g., submission queues).

In an illustrated embodiment, the system 100 may include a communications path 106. In various embodiments, the communications path 106 may include a bus or group of wires connecting the host computing device 102 and the storage device 108. In various embodiments, the path 106 may include a PCIe high-speed serial computer expansion bus. It is understood that the above is merely one illustrative example to which the disclosed subject matter is not limited. Some other examples of communication paths between the host and storage device can include, but are not be limited to, Ethernet, remote direct memory access (RDMA), Fiber Channel, SCSI, serial advanced technology attachment (SATA), transmission control protocol/internet protocol (TCP/IP), Infiniband, and/or the like.

In various embodiments, the path 106 may transmit data, and the host device 102 and storage device 108 may communicate data, using a data protocol that employs data messages. In various embodiments, this may include the non-volatile memory host controller interface specification (NVMHCIS) or NVMe protocol or interface. It is understood that the above is merely one illustrative example to which the disclosed subject matter is not limited. An NVMe protocol may use different transport protocols as communication paths, of which some examples are mentioned above. The example embodiments disclosed herein may be agnostic to the transport protocol used to carry NVMe protocol from the host device to storage device.

In the illustrated embodiment, the system 100 may include a storage device 108. In another embodiment, the storage device 108 may include a NVM or storage element or memory 146. In various embodiments, the storage element or memory 146 may be configured to store data in a permanent, semi-permanent, or substantially permanent form.

In various embodiments, the storage device 108 may include a host interface circuit 142. The host interface circuit 142 may be configured to communicate with the host computing device 102 via a data protocol that employs data messages.

In the illustrated embodiment, the storage device 108 may include an on-board processor 144 and/or data processing discrete logic. In such an embodiment, the storage device 108 may be referred to as an enhanced or smart storage device, in that it may not only store data but also perform operations or process (at least partially) the data.

As described above, an RPC is a form of procedure, subroutine, or method invocation in which a first device requests that a second device executes a specific procedure remotely on the second device. The procedure, when run remotely, may touch on data that are local to the second device and by doing so, work more efficiently with the first device latencies. The RPC may include a mechanism that generally packages the input parameters to the called procedure at the first device's side.

In the illustrated embodiment, a remote procedure call may occur locally (e.g., within the same system 100 or chassis). In addition, in the illustrated embodiment, the calling and serving devices may be separated by both physical and virtual address spaces.

In various embodiments, the technique described herein may be implemented remotely over a network. For example, NVMe local and NVMe over Fabrics (NVMe-oF) are two such embodiments that provide a block device interface to a host operating system (OS) or device without distinguishing its transport backend. Some example NVMe transport protocols can include, but not be limited to, Ethernet, RDMA, Fiber Channel, TCP/IP, Infiniband, or proprietary transport methods carrying NVMe protocol.

In some examples, an RPC protocol may be implemented using a network protocol stack such as the transmission control protocol (TCP) and the internet protocol (IP) for communication. In the illustrated embodiment, the RPC messages may be transmitted over a local communications path 106, such as over a PCIe. As described above, a PCIe may not necessarily only be a network protocol, but rather, may be a bus interface used within a host server or a chassis to connect end devices and peripherals to the host. In various embodiments, RPC tunneling over a PCIe may be employed to connect a software stack running on a host computing device 102 to the services being hosted on a storage device 108 directly attached to that host. This mechanism may allow certain application functions to be offloaded and accelerated onto a storage device 108 (e.g., NVMe SSD) without configuration changes to the host stack.

The disclosed systems for message tunneling using an NVMe may allow any other application level protocols, other than RPC, to be implemented between the host and SSD. RPC is just one example; however, the tunneling mechanisms described herein can be agnostic to the specific implementation used between the host and the SSD. There can be a variety of standard and/or custom and/or proprietary protocols implemented in the system 100 that may be used on top of the bi-directional, full-duplex, and high-performance message tunneling techniques described herein.

In the illustrated embodiment, the system 100 may be configured to preform remote procedure calls between the host computing device 102 and the storage device 108. In such an embodiment, the host computing device 102 may be configured to request that the storage device 108 perform an operation upon the data 182 stored by the storage device 108. In such an embodiment, the transfer of the data 182 between the storage device 108 and the host computing device 102 may be avoided or at least reduced. As described above, such a reduction may save power and bandwidth, while reducing latency or other computer resource usage.

Figure 3:
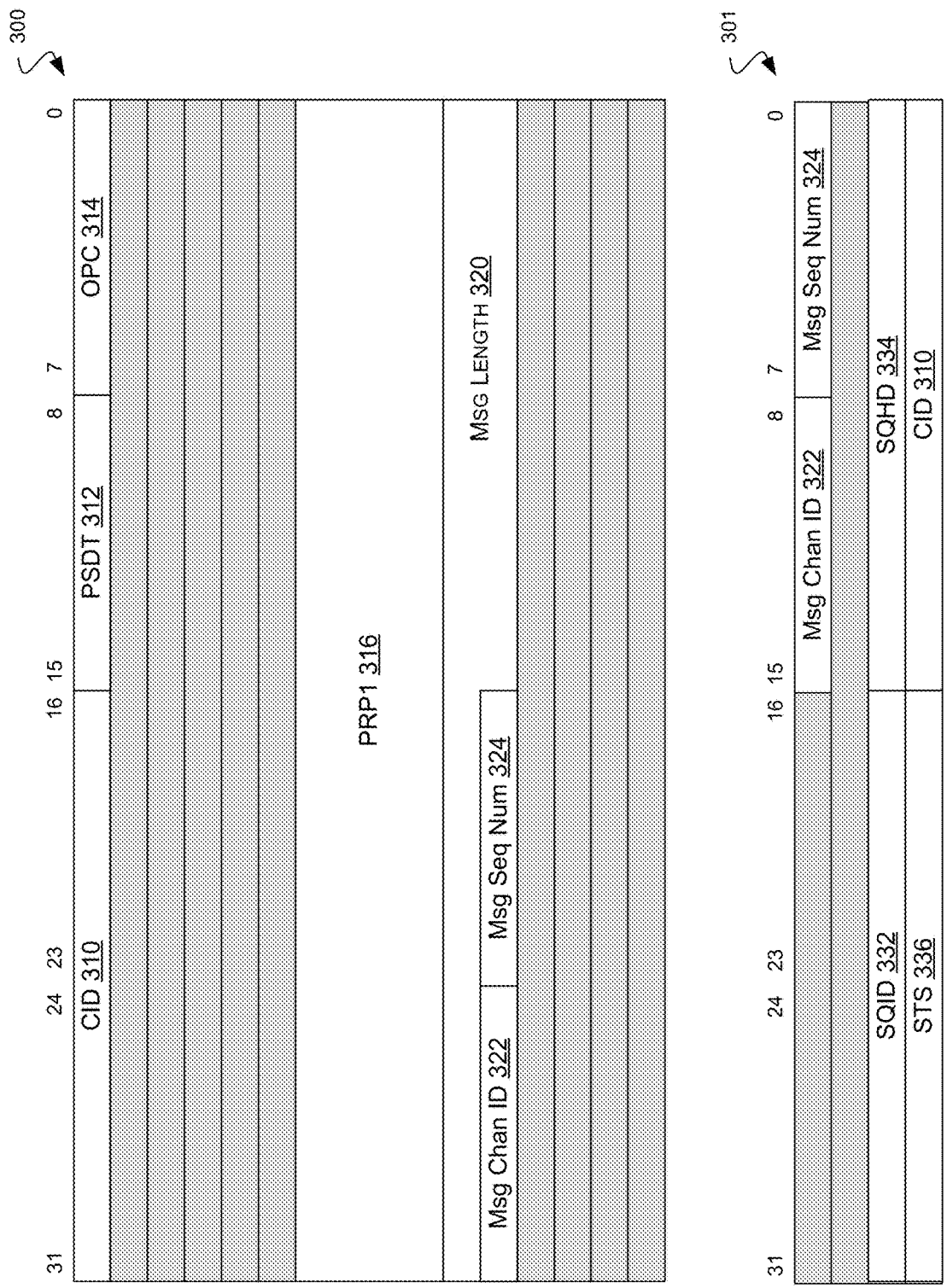
FIG. 3 is a diagram of example embodiments of data structures that may be used with tunneling data messages sent from a host computing device in accordance with the disclosed subject matter.
Figure 4:
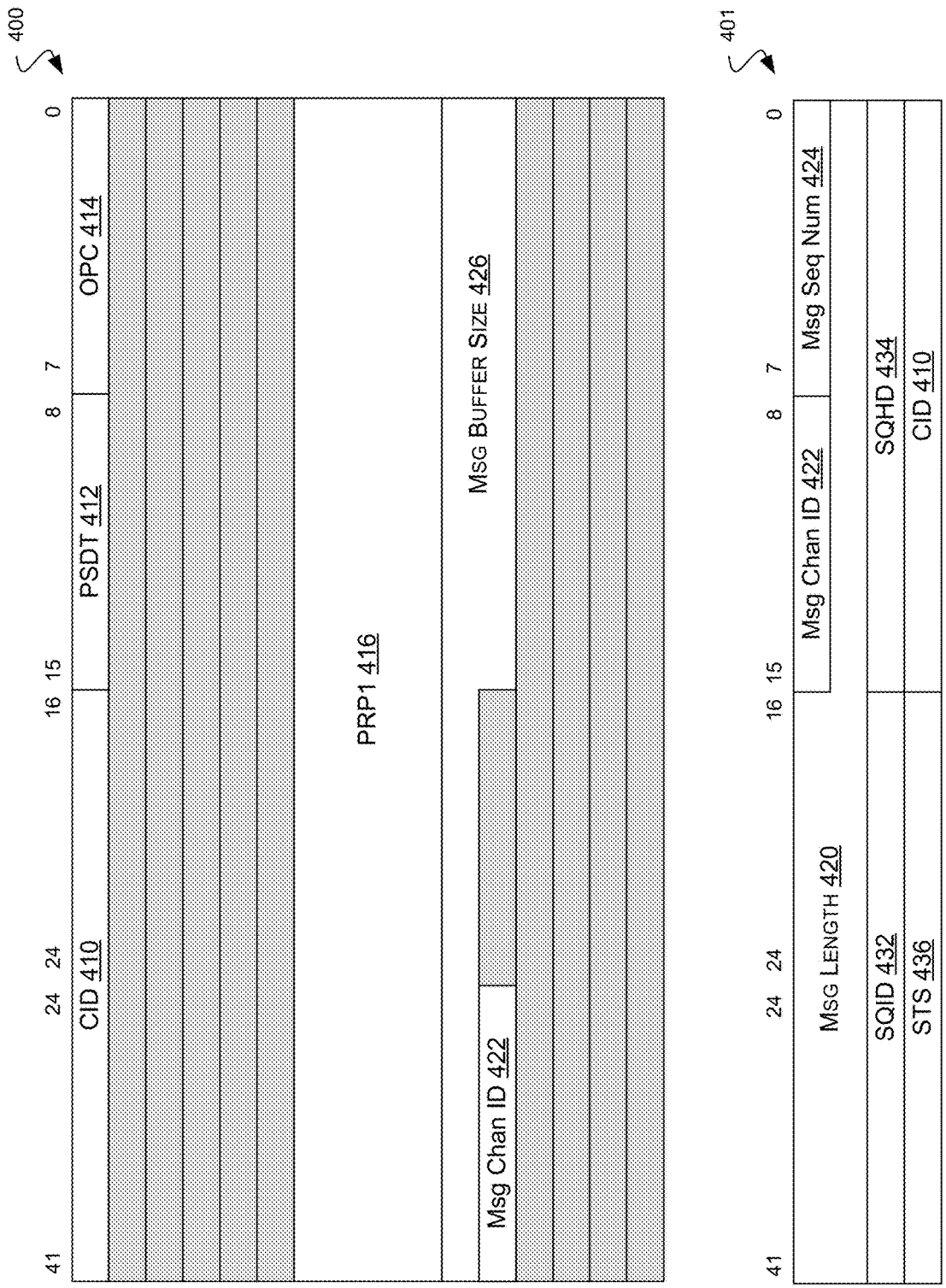
FIG. 4 is a diagram of more example embodiments of data structures that may be used with tunnel data messages sent from an enhanced storage device in accordance with the disclosed subject matter.

In the illustrated embodiment, the host computing device 102 and storage device 108 may encode, embed, or tunnel their communications or messages within the data protocol, and more specifically the data messages of the protocol. In such an embodiment, the RPC may follow the protocol and conventions of a data message. For example, the RPC may, apparently, or purportedly (but not in actuality) appear to be an NVMe data message, but be embedded within a data message, thereby appearing to be a data message instead of an RPC. In various embodiments, the format of the data message may be described in relation to FIGS. 3 and 4, shown below. It is understood that the above are merely a few illustrative examples to which the disclosed subject matter is not limited.

In such an embodiment, the communications path 106 may include both data messages 194 (which are in fact tunneled RPCs) and actual data messages 192 or transfers of data.

In such an embodiment, the messaging (e.g., PCIe) tunnel may provide a way to transport messages between the host computing device 102 and the storage device 108. In various embodiments, the messaging tunnel may be agnostic to the actual message content, as it may not interpret the data messages (whether actual or merely ostensible). In such an embodiment, the tunnel message may appear as just another block of data to the messaging tunnel that is being transferred to the other side of the communications path 106. In various embodiments, multiple forms or techniques of performing the tunneling are contemplated.

Figure 2:
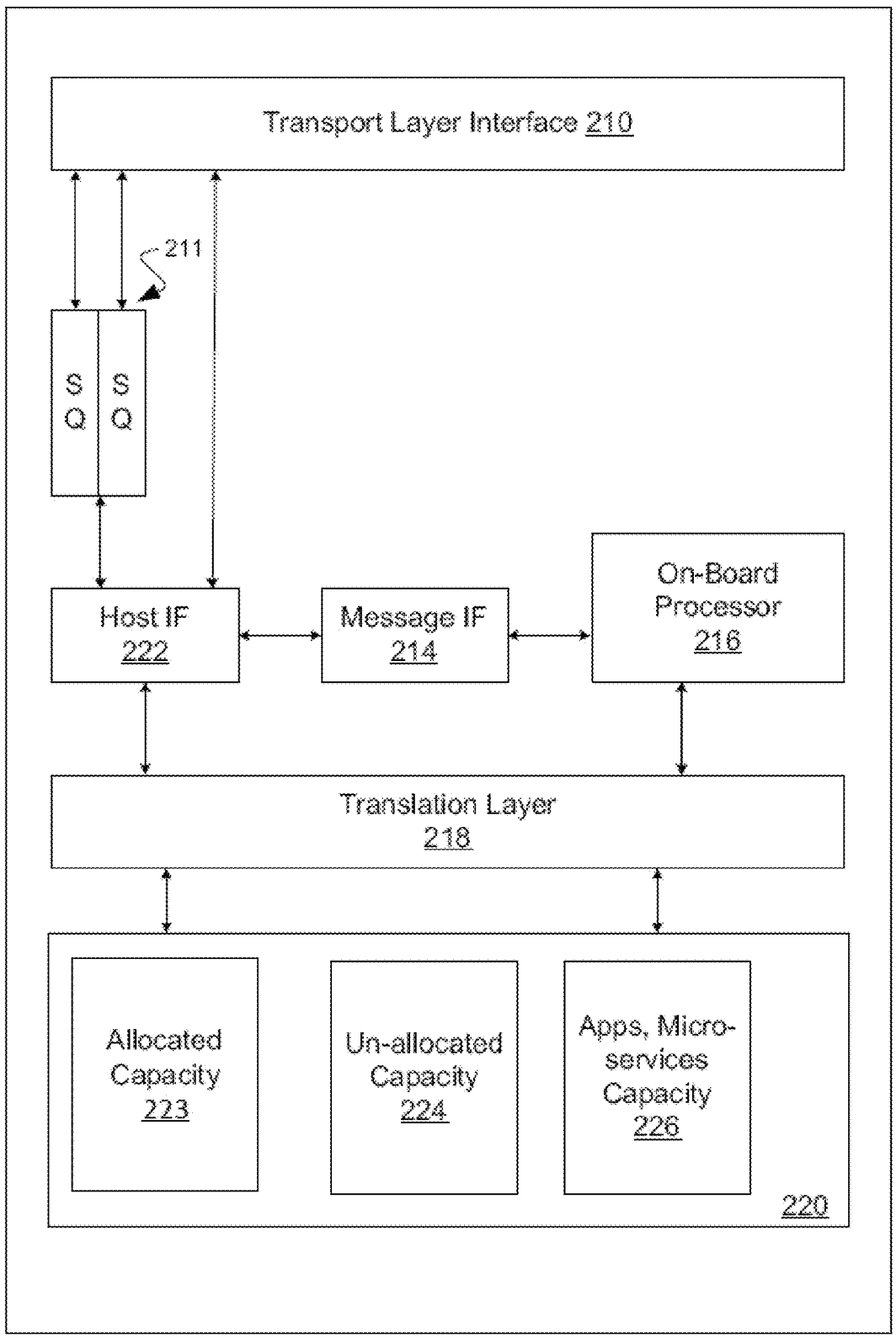
FIG. 2 is a block diagram of an example embodiment of a storage device that utilizes a tunneling data message in accordance with the disclosed subject matter.

FIG. 2 is a block diagram of an example embodiment of a system 200 in accordance with the disclosed subject matter. In various embodiments, the system 200 may include a storage device which, in some embodiments, may be referred to as a smart storage device or enhanced storage device. In various embodiments, the system 200 may communicate with a host computing device via a tunneling protocol and perform operations upon data at the request of the host computing device.

In various embodiments, the system 200 may include a transport layer interface circuit 210. In various embodiments, the transport layer interface circuit 210 may be configured to communicate, via the communications path or transport layer (e.g., Ethernet, RDMA, TCP/IP), with a host computing device.

In the illustrated embodiment, the system 200 may include one or more command submission queues (SQs) 211. In various embodiments, each SQ 211 may be configured to store commands as they await execution by the system 200. System 200 depicts an NVMe-oF-based system in which the command SQs are located on the SSD device side. This system architecture may also be referred to as a remote direct attached storage (RDAS). In a direct attached storage (DAS) system architecture, SQs are maintained in the host system memory and not on the SSD device side. In any case, embodiments of the present disclosure are agnostic to the location of the SQs, as well as to the underlying system architecture.

In the illustrated embodiment, the system 200 may include a host interface circuit 222. In such an embodiment, the host interface (IF) circuit 222 may be configured to communicate with the host computing device via a data protocol that employs data messages (e.g., NVMe).

In such an embodiment, the host interface circuit 222 may be configured to receive the storage access commands (e.g., read or write) from the host device (not shown), and respond to the host device when those commands have been processed (successfully or not). In general, a storage access command may include a read/write request command or message, and once accepted, may be fulfilled by and/or responded to by the system 100, for example, by the system 100 sending the host a read/write response command or message.

In some embodiments, the host interface circuit 222 may be configured to detect whether a tunneling, or command message or tunneling command is embedded within an data message. As described below, in such an embodiment, the host interface circuit 222 may be configured to extract information from the tunneling data message and route the tunneling data message to the on-board processor and/or data processing logic 216.

In the illustrated embodiment, the system 200 may include a message interface circuit 214. In various embodiments, the message interface circuit 214 may be configured to process the tunneling data message and provide the desired information associated with the tunneling data message to the on-board processor and/or data processing logic 216.

In the illustrated embodiment, the system 200 may include an on-board processor 216. It may also be possible to have discrete data processing logic, such as logic gates and state machines, instead of or in addition to an on-board processor. In various embodiments, the on-board processor and/or data processing logic 216 may be configured to execute one or more operations in response to the tunneled command or tunneling data message.

In the illustrated embodiment, the system 200 may include a translation layer circuit 218. In various embodiments, this may include a flash translation layer (FTL). However, it is understood that the above is merely one illustrative example to which the disclosed subject matter is not limited.

In various embodiments, the translation layer circuit 218 may be configured to perform low-level management of the persistent memory or storage element 220. In various embodiments, this may include writing (or, in the parlance of some technologies, "program") data to the storage element 220, performing wear leveling to assure that writes are occurring sufficiently uniformly throughout the storage element 220, generating metadata and/or error correction code, and performing garbage collection of recycling invalid storage locations within the storage element 220. In various embodiments, the translation layer circuit 218 may perform logical address block translation. It is understood that the above are merely a few illustrative examples to which the disclosed subject matter is not limited.

In the illustrated embodiment, the system 200 may include a storage element 220. In such an embodiment, the storage element 220 may be configured to store data. In various embodiments, the storage element 220 may include one or more storage technologies, such as NAND storage, ferromagnetic storage, SSD, etc. In the illustrated embodiment, the storage will be described as solid-state storage for the sake of illustration. It is understood that the above are merely a few illustrative examples to which the disclosed subject matter is not limited.

In various embodiments, the storage element 220 may include a portion that has allocated capacity 223 or is actually storing data. The storage element 220 may include a portion that has unallocated capacity 224 or is free to store data. The storage element 220, in various embodiments, may also include a space or portion 226 that stores applications (apps) or micro-services (collectively, procedures) that may be executed by the on-board processor and/or data processing logic 216. In various embodiments, these procedures, methods, and/or applications may be remotely called by the host computing device. In response, the on-board processor and/or data processing logic 216 may perform an operation using data stored in the storage element and/or supplied by the host computing device, and then return the output data to either the storage element 220 or the host computing device. It is understood that the above are merely a few illustrative examples to which the disclosed subject matter is not limited.

In one embodiment, as part of the process of the host computing device sending a message (e.g., RPC) to the storage device or system 200, the message may first be created in the host memory. In various embodiments, the host computing device may then pass a pointer to the message and a size of the message to the NVMe driver. The NVMe driver may then create a tunneled message (e.g., "tnl_msg_send") command and place that in a command SQ 211. The host computing device may then notify the storage device or system 200 that a message is waiting for it by issuing a command, for example, a "tnl_msg_send" NVMe command.

In various embodiments, the storage device or system 200 may select or read that particular SQ 211, and, according to the protocol, may execute that particular tunneling command. In various embodiments, the system 200 may first fetch the tunneled message or command from the host memory. As described above, the actual tunneled message may appear or be in the protocol of a data message, as expected by the communications medium (e.g., NVMe).

In the illustrated embodiment, the host interface layer (HIL) or circuit 222 may interpret the fetched (ostensible) data message. In such an embodiment, the host HIL or circuit 222 may recognize that the message is a tunnel command (e.g., tnl_msg_send).

In various embodiments, the HIL 222 may extract and use the message address and the message size values from the command to fetch the message data from the host memory. In some embodiments, the HIL 222 may also extract a message sequence number field from the command to deliver the fetched messages in an in-order fashion to the message interface circuit 214.

In various embodiments, once the message has been successfully fetched, the HIL 222 may place a command completion entry (CE) in the appropriate command completion queue (CQ) in the host memory. In various embodiments, the HIL 222 may place a message channel identifier (ID) and the message sequence number of the fetched message into that CE. In some embodiments, after the command CE is posted to the host, the HIL 222 may send a signal, such as an interrupt to the host to indicate that a CE is in the CQ.

FIG. 3 is a diagram of example embodiments of data structures 300 and 301 in accordance with the disclosed subject matter. In various embodiments, these data structures 300 and 301 may be employed for tunneling messages from the host computing device to the storage device.

In the illustrated embodiment, the data structure 300 may show an example layout of a vendor-defined NVMe command called, for example, tnl_msg_send command or tunneling message send command. As described above, the data structure 300 may follow the formatting of the NVMe protocol but may include a command to the storage device.

In the illustrated embodiment, the data structure 300 may include a command ID (CID) 310 that uniquely identifies the NVME command during execution by the SSD device. In the illustrated embodiment, the data structure 300 may include field physical region page (PRP) or scatter gather list (SGL) for data transfer (PRP or SGL for Data Transfer (PSDT)) 312 that indicates whether PRPs or SGLs are used for the transfer of data associated with the command. In the illustrated embodiment, the data structure 300 may include an opcode (OPC) field 314 (e.g., tnl_msg_send) that indicates the type of command.

In the illustrated embodiment, the data structure 300 may include a physical PRP or PRP1 field 316 that includes a pointer to a physical memory page where data are stored for use by the storage device. In the illustrated embodiment, the data structure 300 may include a message length field 320 that indicates the length of the message. The data structure 300 may also include message channel ID 322 and message sequence number 324 fields.

As described above, the HIL may retrieve the message from the SQ. Via the OPC 314, the HIL may determine that this is a message tunnel command. The HIL may then use the message address (e.g., PRP1 316, PSDT 312) and the message size values (e.g., fields 322 and 320) to fetch the message from the host memory. The message interface circuit 214 may use the sequence number field 324 to deliver the message in proper order to the storage device's firmware or hardware that processes the application layer messages.

In the illustrated embodiment, the data structure 301 may include an example layout of the CE associated with the tnl_msg_send command. In such an embodiment, the data structure 301 may include message channel ID 322 and message sequence number 324 fields to match the CE with the command (e.g., data structure 300). In various embodiments, the data structure 301 may include a submission queue ID (SQID) field 332 that indicates the SQ from which the associated command was issued. This is SQ header pointer (SQHD) field 334 that indicates the current pointer for the associated SQ. In various embodiments, the data structure 301 may include a status and phase tag (STS) field 336 and a CID field 310.

As described above, in various embodiments, once the message has been transferred, the HIL creates the data structure 301 or CE. The HIL places the CE in the appropriate command CQ of the host memory. The HIL may then send an interrupt to the host to indicate that the CE has been placed.

As shown in FIG. 2, the host (e.g., NVMe) driver may be configured to provide a mechanism for the system 200 to transmit messages to the host computing device. In one embodiment, the host driver may pre-issue a number of receive commands (e.g., NVMe tnl_msg_recv commands) to the system 200. In such an embodiment, this may keep a certain number of receive commands outstanding. In such an embodiment, when the system 200 transmits a message to the host computing device, it may complete one of those outstanding NVMe receive commands. It is understood that the above is merely one illustrative example to which the disclosed subject matter is not limited.

In various embodiments, the host computing device's driver may first allocate a buffer in the host memory. In such an embodiment, it may then create a tunneling message receive command that includes a pointer to the allocated buffer and the size of the buffer. In some embodiments, the driver may allocate only one-sized buffers or different-sized buffers. In various embodiments, it may also add a message channel ID to the command. As described above, in various embodiments, the host may then place the created command into one of the SQs (e.g., NVMe), and alert the system 200 that this has been done. In some embodiments, for example, NVMe-oF systems, the host computing device may not provide this alert; rather, the host computing device may send the command directly to the system 200.

In such an embodiment, at some point, the system 200's HIL circuit 222 may select the command for execution. As part of the command execution, the system 200 (via the transport layer interface 210) may fetch the tunneling command (e.g., tnl_msg_recv).

In various embodiments, the fetched command may indicate that that command may stay outstanding until the system 200 sends a message to the host. The number of outstanding commands issued may depend upon the host buffer memory available and/or the maximum number of messages the host computing device is configured to receive in a given time. The number of such outstanding commands may also be used as a flow control mechanism by the host computing device to limit the number of messages transmitted by the system 200.

In various embodiments, when the system 200 sends a message to the host computing device, it may make use of one of the outstanding receive commands. In such an embodiment, the system 200 may employ the host buffer memory pointer to transfer a message to the host memory. In various embodiments, the message interface circuit 214 may be configured to determine that the message length is within the message buffer size indicated in the command.

In such an embodiment, after the message is transferred, the HIL circuit 222 may create a CE for that command. The HIL circuit 222 may place the message channel ID, message sequence number, and message length fields in the CE. The HIL circuit 222 may then place the CE into an appropriate command CQ in the host memory. In various embodiments, as described above, the system 200 may send an interrupt, such as a message signaled interrupt (MSI) or similar signal, to the host computing device.

In various embodiments, when the host computing device's driver recognizes that a tunneling command CE has been received, the host computing device's driver may extract the message channel ID, message sequence number, and message length from the CE. In some embodiments, the host message tunnel software may then use that information to deliver the received message to the upper layer software in the host system software stack in an in-order manner.

In various embodiments, the host driver may periodically issue additional tunneling message receive (e.g., tnl_msg_recv) commands to increase the number of available open message buffers for the system 200 to send messages to the host computing device. It is understood that the above is merely one illustrative example to which the disclosed subject matter is not limited.

FIG. 4 is a diagram of example embodiments of data structures 400 and 401 in accordance with the disclosed subject matter. In various embodiments, these data structures 400 and 401 may be employed for tunneling messages to the host computing device from the storage device.

In the illustrated embodiment, the data structure 400 may show an example layout of a vendor-defined NVMe command called, for example, tnl_msg_recv or tunneling message receive. As described above, the data structure 400 may follow the formatting of the data message protocol but may include a command to the storage device.

In the illustrated embodiment, the data structure 400 may include a CID 410 that uniquely identifies the NVMe command during execution by the SSD device. In the illustrated embodiment, the data structure 400 may include field PSDT 412 that indicates whether PRPs or SGLs are used for a transfer of data associated with the command. In the illustrated embodiment, the data structure 400 may include an OPC field 414 (e.g., tnl_msg_recv) that indicates the type of command.

In the illustrated embodiment, the data structure 400 may include a PRP or PRP1 field 416 that includes a pointer to a physical memory page where data are stored for use by the storage device. The data structure 400 may also include message channel ID 422 field. In the illustrated embodiment, the data structure 400 may include a message buffer size field 426 that indicates the allocated size of the buffer associated with the message.

As described above, the host driver may create the data structure 400 or tunneling receive message (tnl_msg_recv) command. The host driver may then place the created command in the SQ. The storage device may fetch the tunneling receive message command from the SQ. When the storage device communicates with the host device, the storage device may use the host buffer memory pointer in the data structure 400 to write a message to the host computing device. Once the message is transferred, the storage device's HIL may create a completion entry or data structure 401 for that command.

In the illustrated embodiment, the data structure 401 may include an example layout of the CE associated with the tunneling data message. In such an embodiment, the data structure 401 may include message channel ID 422 and message sequence number 424 fields to match the CE with the command (e.g., data structure 400). In various embodiments, the data structure 401 may include a SQID field 432 that indicates that the SQ from which the associated command was issued and an SQHD field 434 that indicates the current pointer for the associated SQ. In various embodiments, the data structure 401 may include a status and STS field 436 and a CID field 410. The CE may contain a length field 420 (e.g., an MSG LENGTH field) that can indicate the length of the message transferred from the SSD device to the host device. The CE contains a message channel ID field 422 (e.g., a MSG CHAN ID) and a message sequence number field 424 (e.g., a MSG SEQ NUM field) that indicate the tunneling channel ID and the message sequence number so that the host driver can provide the messages received from the device in an in-order fashion to the upper layer software.

As described above, in various embodiments, once the message has been transferred, the HIL may create the data structure 401 or CE. The HIL places the CE in the appropriate command CQ of the host memory. The HIL may then send an interrupt to the host to indicate that the CE has been placed.

In FIG. 1, additional features of the disclosed subject matter are described. For example, the following techniques may be employed for flow control between the host computing device 102 and the storage device 108. In various embodiments, the message tunnel may operate in a full-duplex, high-performance manner. In such an embodiment, the message tunnel may employ at least some features of the data protocol (e.g., NVMe) to perform flow control. In various embodiments, flow control may include a back pressure feature. Back pressure (or backpressure) is a resistance or force opposing the desired flow of data. In such an embodiment, the flow of data may be reduced.

In one embodiment, for the messages travelling from the host computing device 102 to the storage device 108, the host device may submit tunneling message send commands to one or more command SQs. In such an embodiment, after being alerted to the entry in the SQ, the storage device 108 may fetch the commands and execute them.

In various embodiments, when the storage device 108's resources for receiving messages are running low, or for any other reason, the storage device 108 may apply flow control to the host computing device 102. In particular, the storage device 108 may reduce the rate of tunneling message send (tnl_msg_send) command execution. In some embodiments, the storage device 108 may delay the execution, pause the execution, or reduce the rate of execution of tnl_msg_send commands. In such an embodiment, the storage device 108 may throttle the number of messages the host computing device 102 is sending to the storage device 108.

Conversely, for the messages travelling from the storage device 108 to the host computing device 102, the host computing device 102 may apply flow control as needed. In one embodiment, to receive messages from the storage device 108, the host computing device 102 may submit tunneling message receive (tnl_msg_recv) commands into one or more command SQs. The host computing device 102 may then indicate to the storage device 108 that a message is in the SQ. The storage device 108 may then fetch those commands or may maintain the commands outstanding until the storage device 108 sends a message to the host computing device 102. To apply back-pressure, the host computing device 102 may reduce the number of outstanding or enqueued tunneling message receive commands. In some embodiments, the host computing device 102 may also abort some or all of the currently outstanding commands (e.g., tnl_msg_recv commands). By reducing the number of such commands, the host computing device 102 may throttle the storage device 108 and thereby limit its ability to transmit messages to the host.

In various embodiments, the system 100 may be configured to provide a quality of service (QoS) feature to the tunneling messaging protocol. In such an embodiment, the QoS feature may aid in the performance of the operations. The QoS features may be applied to an individual message channel and/or direction of flow.

In one embodiment, the disclosed systems implementing message tunneling as described herein may support multiple concurrently active tunnels also known as channels. In such an embodiment, tunnels may be identified by substantially unique message channel IDs. In some embodiments, the system 100 may provide differentiated QoSs to different message channels. In such an embodiment, some channels may be designated as higher priority than others.

In one embodiment, such differentiation may be achieved by using dedicated command SQ and CQ for different message channels. For example, in one embodiment, the NVMe protocol provides a method of SQ arbitration to provide a varying degree of QoS. Additionally, in various embodiments, a storage device 108 may implement a message layer that can assign appropriate resources and apply differentiated execution priorities between the message channels. In one embodiment, the QoS configurations for the message tunnels may be performed by the host computing device 102 using the Set Feature/Get Feature commands of the NVMe protocol. It is understood that the above is merely one illustrative example to which the disclosed subject matter is not limited. In another embodiment, the SSD device may have default QoS configurations. In yet another embodiment, the QoS settings for tunneling channels may be provided by a baseboard management controller (BMC) device to the SSD device. In particular, the BMC may provide QoS settings based on the storage administrator guidance, direction, and policy settings of such a BMC device. In one embodiment, the BMC may be located on a host device, such as host computing device 102 in FIG. 1.

In various embodiments, the system 100 may be substantially compliant with the underlying data protocol. In such an embodiment, the storage device 108 may provide a data protocol (e.g., NVMe or PCIe) that is substantially standards-compliant and based on the storage interface. In such an embodiment, the host (NVMe) driver and the storage stack may still perform input/output (IO or I/O) operations to the storage device 108. The message tunneling feature may coexist with normal storage functionality and may not interfere with it. The message tunneling functionality may employ dedicated command SQs and CQs. In various embodiments, the storage device 108's host interface circuit (HIL) may apply a programmable priority to the tunneling commands versus normal storage commands. In some embodiments, the tunneling feature may be enabled or disabled, or it may be configured by the host software or by the BMC device to the SSD device, for example, by adjusting the storage administrator guidance, direction, and policy settings.

Figure 5:
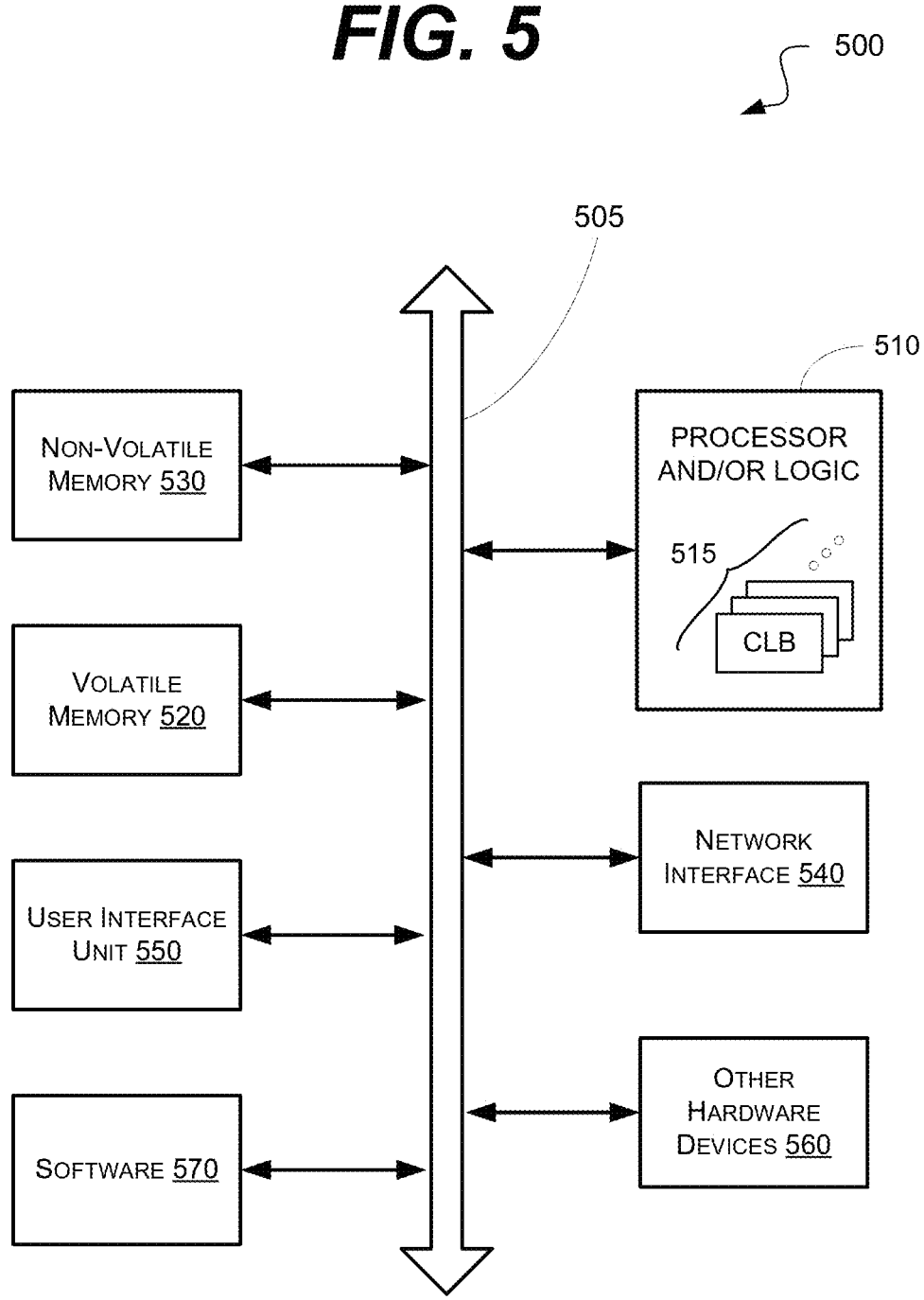
FIG. 5 is a block diagram of an information processing system that may include devices formed according to principles of the disclosed subject matter for computer communication and, more specifically, according to a method and system for message tunneling using NVMe.

FIG. 5 is a schematic block diagram of an information processing system 500, which may include semiconductor devices formed according to principles of the disclosed subject matter.

As shown to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as a laptop, desktop, workstation, server, blade server, personal digital assistant, smartphone, tablet, and other appropriate computers or a virtual machine or virtual computing device thereof. In various embodiments, the information processing system 500 may be used by a user (not shown).

The information processing system 500 according to the disclosed subject matter may further include a CPU, logic, or processor 510. In some embodiments, the processor 510 may include one or more functional unit blocks (FUBs) or combinational logic blocks (CLBs) 515. In such an embodiment, a CLB may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that, while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductor (CMOS) transistors. In various embodiments, these CMOS transistors may be arranged into gates that perform the logical operations, although it is understood that other technologies may be used and are within the scope of the disclosed subject matter.

The information processing system 500 according to the disclosed subject matter may further include a volatile memory 520 (e.g., RAM). The information processing system 500 according to the disclosed subject matter may further include a NVM 530 (e.g., a hard drive, an optical memory, a NAND or Flash memory). In some embodiments, either the volatile memory 520, the NVM 530, or a combination or portions thereof may be referred to as a "storage medium." In various embodiments, the volatile memory 520 and/or the NVM 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g and 802.11n. Examples of a cellular protocol may include, but are not limited to, IEEE 802.16m (aka Wireless Metropolitan Area Networks (MANS)), Advanced, Long-Term Evolution (LTE) Advanced, Enhanced Data rates for GSM (Global System for Mobile Communications) Evolution (EDGE), Evolved High-Speed Packet Access (HSPA+), and International Mobile Telecommunications-2020 standard (aka cellular 5G). Examples of a wired protocol may include, but are not limited to, IEEE 802.3 (aka Ethernet), Fibre Channel, power line communication (e.g., HomePlug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, a human interface device). In various embodiments, this user interface unit 550 may be configured to either receive input from a user and/or provide output to a user. Other kinds of devices may be used to provide for interaction with a user, as well; for example, feedback provided to the user may be any form of sensory feedback, such as visual feedback, auditory feedback, or tactile feedback, and input from the user may be received in any form, including acoustic, speech, or tactile input.

In various embodiments, the information processing system 500 may include one or more other devices or hardware components 560 (e.g., a display or monitor, keyboard, mouse, camera, fingerprint reader, or video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the NVM 530, the network interface 540, the user interface unit 550, and one or more hardware components 560. Data processed by the processor 510 or data inputted from outside of the NVM 530 may be stored in either the NVM 530 or the volatile memory 520.

In various embodiments, the information processing system 500 may include or execute one or more software components 570. In some embodiments, the software components 570 may include an OS and/or an app. In some embodiments, the OS may be configured to provide one or more services to an app and manage or act as an intermediary between the app and the various hardware components (e.g., the processor 510, a network interface 540) of the information processing system 500. In such an embodiment, the information processing system 500 may include one or more native apps, which may be installed locally (e.g., within the NVM 530) and configured to be executed directly by the processor 510 and directly interact with the OS. In such an embodiment, the native apps may include pre-compiled machine executable code. In some embodiments, the native apps may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 510.

Figure 6:
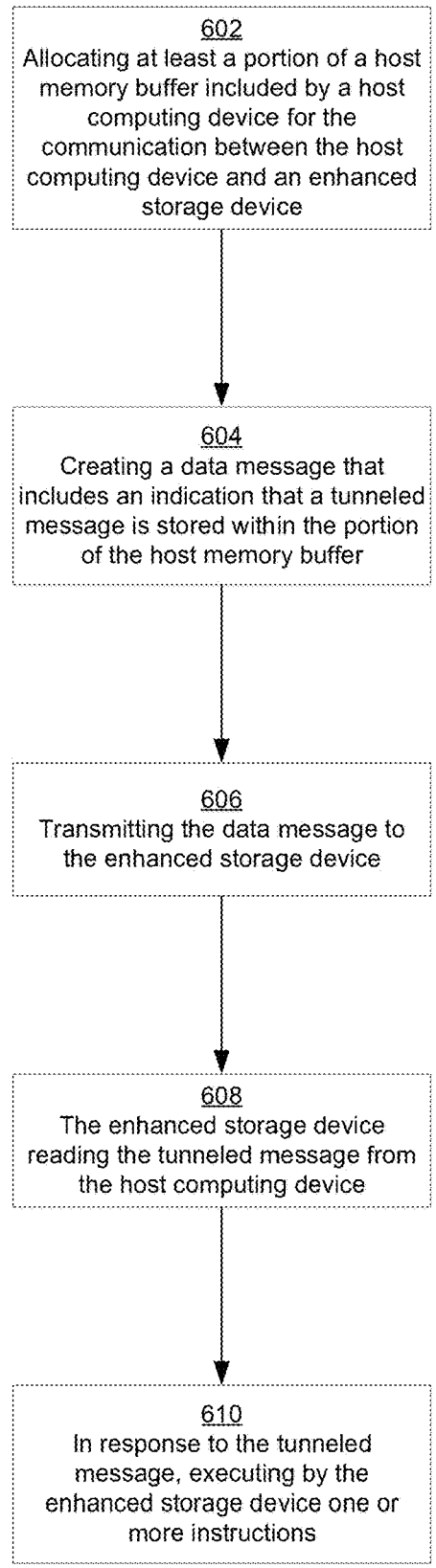
FIG. 6 is a diagram of an example embodiment of a technique to process tunneling data messages in accordance with the disclosed subject matter.

FIG. 6 is a flow chart of an example embodiment of a technique in accordance with the disclosed subject matter. In various embodiments, the technique 600 may be used or produced by the systems, such as those of FIG. 1, 2, or 5. Furthermore, portions of technique 600 may be used data structures such as that of FIG. 3 or 4. However, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, at least a portion of a host memory buffer included by a host computing device may be allocated for the communication between the host computing device and an enhanced storage device, as described above. Block 604 illustrates that, in one embodiment, a data message may be created that includes an indication that a tunneled message is stored within the portion of the host memory buffer, as described above.

Block 606 illustrates that, in one embodiment, the data message may be transmitted to the enhanced storage device, as described above. Block 608 illustrates that, in one embodiment, the enhanced storage device may read the tunneled message from the host computing device, as described above. Block 610 illustrates that, in one embodiment, in response to the tunneled message, the enhanced storage device may execute one or more instructions, as described above.

Method steps may be performed by one or more programmable processors executing a computer program to perform functions by operating on input data and generating output. Method steps also may be performed by, and an apparatus may be implemented as, special purpose logic circuitry, e.g., a field programmable gate array (FPGA) or an application-specific integrated circuit (ASIC). In various embodiments, this circuitry may be included by the storage device and/or host computing device.

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., compact disc read-only memory (CD-ROM), hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. Device comprising:
   an interface circuit configured to communicate with a host device using a protocol; and
   a storage element configured to store data based on a data message of the protocol;

the interface circuit further configured to:
  determine a command associated with the data message;
  determine a message address information from the data message; and
  obtain from the host device, using the message address information, a message stored on the host device.

2. The device of claim 1, further comprising an on-board processor configured to execute one or more instructions based on the message.

3. The device of claim 1, wherein the interface circuit is configured to obtain the message from a host memory associated with the device.

4. The device of claim 1, wherein the interface circuit is configured to, based on a successful retrieval of the message, indicate that the data message is in a first state.

5. The device of claim 4, wherein the interface circuit is configured to, based on a successful retrieval of the message, transmit an interrupt signal to the host device.

6. The device of claim 1, wherein the device is configured to:
  maintain one or more data received messages to the host device in a first state, and
  based on an initiation of a message with the host device, close one of the data received messages by transmitting a data message to the host device.

7. The device of claim 6, wherein a data received message indicates that a portion of a host memory has been allocated on the host device.

8. The device of claim 6, wherein the interface circuit is further configured to, based on a request to transmit a message to the host device:
  determine, from a data received message, a pointer to a portion of a host memory that has been allocated on the host device.

9. The device of claim 8, wherein the interface circuit is further configured to asynchronously transfer the message to the portion of a host memory.

10. The device of claim 1, wherein the interface circuit is configured to perform data message flow control using the protocol for data messages.

11. A system comprising:
  a host computing device comprising:
    a processor configured to:
      read and write data from a storage device, and
      offload commands to the storage device; and
  the storage device comprising:
    an interface circuit configured to communicate with the host computing device using a protocol; and
    a storage element configured to store data based on a data message of the protocol;
    the interface circuit further configured to:
      determine when a command is associated with the data message;
      determine a message address from the data message; and
      obtain, using the message address, a message stored in a memory of the host computing device.

12. The system of claim 11, further comprising an on-board processor configured to execute one or more instructions based on the message.

13. The system of claim 11, wherein the interface circuit is configured to, based on a successful retrieval of the message, indicate that the data message is in a first state.

14. The system of claim 13, wherein the interface circuit is configured to, based on a successful retrieval of the message, transmit an interrupt signal to the host computing device.

15. The system of claim 11, wherein the storage device is configured to:
  maintain one or more data received messages to the host computing device in a first state, and
  based on an initiation of a message with the host computing device, close one of the data received messages by transmitting a data message to the host computing device.

16. The system of claim 15, wherein a data received message indicates that a portion of the memory of the host computing device has been allocated on the host computing device.

17. The system of claim 15, wherein the interface circuit is further configured to, based on a request to transmit a message to the host computing device:
  determine, from a data received message, a pointer to a portion of the memory of the host computing device that has been allocated on the host computing device.

18. The system of claim 17, wherein the interface circuit is further configured to asynchronously transfer the message to the portion of a host memory.

19. The system of claim 11, wherein the interface circuit is configured to perform data message flow control using the protocol for data messages.

20. A method to be executed on a device, the method comprising:
  determining, by an interface circuit on the device, a command embedded within a data message;
  determining, by the interface circuit, message address information from the data message; and
  retrieving, from a host device, using the message address information, a message stored on the host device, wherein the interface circuit is configured to communicate with the host device using a protocol.

* * * * *